July 4, 1967
C. PAUL ETAL
3,329,735
MANUFACTURE OF ETHYLENE- AND PROPYLENE-RICH GASES
Filed March 27, 1964
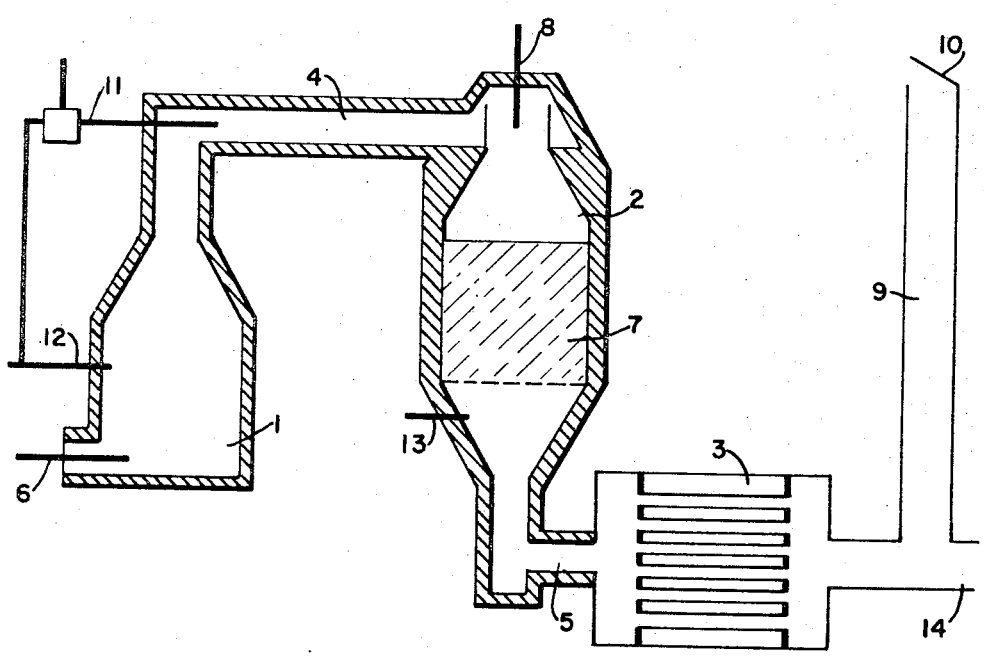
INVENTORS
Claude Paul
BY Jacques Sarlabous
Tourover + Browdy
ATTORNEYS

United States Patent Office 3,329,735
Patented July 4, 1967

3,329,735
MANUFACTURE OF ETHYLENE- AND
PROPYLENE-RICH GASES
Claude Paul and Jacques Sarlabous, Toulouse, France, assignors to Office National Industriel de l'Azote, Toulouse, France, a corporation of France
Filed Mar. 27, 1964, Ser. No. 355,324
Claims priority, application France, Apr. 3, 1963, 4,868
5 Claims. (Cl. 260—683)

The manufacture of gaseous products rich in ethylenic hydrocarbons using continuous processes for the conversion of light petroleum products in the presence of steam has been described in several patent specifications. The conversion is carried out in externally heated tubes so that the reaction temperatures may be low enough to avoid carbon black formation. Such operating conditions entail the generation of gases containing large amounts of condensable by-products with a comparatively low content of aromatic hydrocarbons which is a serious drawback.

In the French Patent 1,059,418, there are proposed a cyclic process and an apparatus for the manufacture of gaseous mixtures containing olefinic hydrocarbons rich in ethylene and propylene from black oils such as gas-oil or fuel-oil in the presence of steam. By using such a process it is possible to avoid the drawbacks due to the formation of carbon black and operate it at elevated temperatures. It is not applicable, however, to the conversion of light gaseous or liquid products containing up to 8 atoms of carbon per molecule as the latter are much more difficult to crack with good yields than the heavier products.

In fact, it has been ascertained that when operating in the presence of thin layers of contact material, according to this process, the same drawbacks as those resulting from the continuous processes are experienced as the gases obtained contain large amounts of condensable products mainly consisting of a more or less rich mixture of aromatic hydrocarbons and untransformed starting materials whatever reaction temperature is used. The by-products are not recyclable to the process stream and besides are not easily vaporizable. If the contact time of the hydrocarbons and steam in the contact bed is increased, the above drawback is done away with but the output is considerably decreased.

The average composition of the condensable products together with their specific gravity measured at 15° C. are shown in the following table based on the condensate to starting material ratio by weight.

| Composition of the Condensate | Weight percent of condensate/starting material | | | |
|---|---|---|---|---|
| | 38.7 | 24 | 18 | 16 |
| Aromatics | 39.3 | 66.7 | 84.6 | 98.6 |
| Olefinics | 16.8 | 6.9 | 5.1 | 1.4 |
| Paraffinics | 43.9 | 26.4 | 10.3 | |
| Specific gravity | 0.738 | 0.783 | 0.811 | 0.882 |

According to a feature of the present invention it has been found that by using a comparatively thick layer of contact material with an elevated height to diameter ratio of between 0.5 and 1.2, preferably between 0.7 and 0.9, it is possible to obtain gaseous products with low contents of condensable hydrocarbons at high space velocities.

The contact mass in accordance with the present invention consists of refractory materials such as the silicates, aluminates, silicoaluminates or the oxides of the metals of the second and/or third groups of the periodic classification such as magnesia and/or alumina with average grain diameters preferably between 10 and 20 millimeters.

The average reaction temperature of between 700° C. and 900° C. is selected according to the ethylene to propylene ratio by weight desired in the final product. At a given hourly space velocity, for instance between 650 and 1,000 kg. of light petrol to be converted per cubic meter of contact mass in a 1-meter deep layer, the ethylene to propylene ratio by weight is increased from 1 to 5 with increasing temperatures whereas the reaction product content of condensable by-products is decreased. If, on the contrary, the space velocity and temperature are simultaneously increased within the specified limits, it is possible to maintain a steady output of olefins.

According to the temperature at which the transformation is carried out, the steam to hydrocarbon ratio by weight, independent of the nature of the starting material, is maintained between 0.5 and 1.5. The role played by steam in the process of the invention is essential because by reducing the partial pressure of the vaporised hydrocarbon the reaction of dehydrogenation and side-chain breakdown are facilitated, the reaction products are protected and the side reactions together with carbon black formation are limited.

Lastly, according to one of the features of the invention, it may be advantageous in some cases to operate in two successive steps in order to obtain both a final gas wherein the ethylene to propylene ratio is next to unity and a small volume of condensate with a high content of easily vaporisable aromatic hydrocarbons.

In a first step, the conversion of the starting material is carried out at a lower temperature and a gas containing 35% to 45% by weight of condensable products is collected. As they contain only about 40% of aromatic hydrocarbons, as shown in the above table, the latter are practically impossible to recycle to the process stream.

In a second step, these condensable products are subjected to higher temperature conversion in the presence of the same weight ratio of steam of 1.08 with an identical bed of contact materials. A comparatively small volume of condensable hydrocarbons containing about 98% of benzene, toluene and xylene, which are easily utilizable, is thus obtained. By gathering the gaseous products collected in the two successive operations, there is obtained a final amount of propylene higher than could be obtained by processing the starting material in one high-temperature step.

The following description, in connection with the annexed diagrammatic drawing, is intended for descriptive purposes only and should not be interpreted to limit or restrict the invention in any way.

As shown in the drawing the installation essentially consists of a combustion chamber 1, a cracking chamber 2, and a recovery boiler 3, connected one to another by lines 4 and 5. The combustion chamber and the cracking chamber are made of a metal shell internally lined with a refractory and insulating brickwork. At the lower part thereof the combustion chamber is equipped with a burner 6 intended to produce during the heating step the hot and oxidising combustion gases to heat contact mass 7 up to the reaction temperature desired and simultaneously induce the combustion of the residual carbon deposit from the preceding cycle. Burner 8 at the upper part of cracking chamber 2 is intended to supply contact mass 7 with make-up heat, in case of need. The heating gases leave cracking chamber 2 via line 5 and pass through recovery boiler 3 wherein the larger part of the sensible heat thereof is given up before being discharged to the atmosphere via stack 9 in which damper 10 is open during the heating step. Self-sufficiently in steam of the process is possible owing to recovery boiler 3.

During the production step the starting material is fed and, in case of need, sprayed and vaporised into connection line 4 with steam by means of injector 11, make-up steam being passed into combustion chamber 1, at 12, wherein it is preheated before being added to the reaction mixture passed into connection line 4. The mixture of hydrocarbons and steam is passed downwards through contact mass 7 in cracking chamber 2 and the reaction products, after undergoing quenching with the steam fed into cracking chamber 2, at 13, pass through recovery boiler 3 then, through line 14, to subsequent processing means for separation, not shown in the drawing, with damper 10 in stack 9 closed.

To avoid mixing the combustion gases containing free oxygen with reducing manufactured gases, and, besides, to recover all the manufactured gas still occupying the volume of the apparatus at the end of the production step, both steps in the cycle are separated by steam purges.

The non-limitative examples hereinafter are given in order to emphasize the wide range of possibilities afforded by the process. Moreover, they show that the amount of ethylene obtained per kilogram of petroleum products is independent of the nature of the latter, the ethylene to propylene ratio varying within wide limits by merely modifying the average reaction temperature, all the other operating conditions being equal, and the condensable products collected in the most severe operating conditions are almost exclusively composed of vaporizable aromatic hydrocarbons.

The basic manufacturing cycle utilized in the following examples has a total length of 6 minutes as follows:

|  | Seconds |
|---|---|
| Production step | 180 |
| Steam purge | 20 |
| Heating step | 150 |
| Steam purge | 10 |

The contact mass bed comprises 1.2 cubic meters of round-shaped grains of magnesia having an average diameter of 15 millimeters distributed through a 1-meter deep layer.

*Example 1*

The starting material is a $C_3$ gaseous fraction resulting from oil refining and containing 80.4% of propane, 19.4% of ethane and 0.2% of nitrogen by volume. The hourly flow of processed gas, mixed with 1,080 kg. of steam, is 1,000 kg.

The composition and volume of the reaction products obtained at average conversion temperatures of 815° C., 837° C., 855° C., and 865° C. are shown in the table hereunder.

| Composition by Weight (kg./100 kg. of starting material) | Average Conversion Temperature (° C.) | | | |
|---|---|---|---|---|
| | 815 | 837 | 855 | 865 |
| $H_2$ | 2.84 | 3.12 | 2.99 | 4.38 |
| $CH_4$ | 17.80 | 20.80 | 25.00 | 27.60 |
| $C_2$ | 9.20 | 7.84 | 6.27 | 4.65 |
| $C_2H_4$ | 29.50 | 32.90 | 35.50 | 36.80 |
| $C_3H_8$ | 24.70 | 20.20 | 14.40 | 11.00 |
| $C_3H_6$ | 14.0 | 13.80 | 10.80 | 9.30 |
| Carbon | 1.96 | 1.34 | 4.04 | 6.07 |

*Example 2*

A light distillate of specific gravity $d_{15} = 0.679$ containing 9 p.p.m. of combined sulphur is subjected to the cyclic conversion at average temperatures ranging between 750° C. and 800° C. Such a petroleum cut, boiling between 56° C. and 105° C., has the following compositions:

|  | Percent |
|---|---|
| Ethylenic hydrocarbons | 2.8 |
| Isoparaffinic hydrocarbons | 66.0 |
| Paraffinic hydrocarbons | 28.2 |
| Naphthenic hydrocarbons | 3.0 |

The composition and weight of the reaction products obtained per hour from 1,000 kg. of the above distillate, with which 1,080 kg. of steam have been mixed, at various conversion temperatures, are shown in the following table.

| Composition by Weight (kg./100 kg. of starting material) | Average Conversion Temperature (° C.) | | | |
|---|---|---|---|---|
| | 750 | 756 | 780 | 802.5 |
| $H_2$ | 1.80 | 2.29 | 3.20 | 3.75 |
| $CH_4$ | 13.60 | 14.70 | 19.20 | 21.20 |
| $C_2H_6$ | 3.80 | 4.14 | 4.36 | 4.82 |
| $C_2H_4$ | 20.00 | 21.50 | 27.00 | 28.80 |
| $C_3H_8$ | 0.90 | 1.01 | 1.28 | 0.84 |
| $C_3H_6$ | 17.50 | 17.40 | 16.30 | 14.10 |
| $C_4$ hydrocarbons | 10.80 | 10.20 | 8.80 | 7.90 |
| Condensable hydrocarbons | 29.60 | 25.00 | 11.60 | 7.00 |
| Carbon | 2.00 | 3.76 | 8.26 | 11.59 |
| $C_2H_4/C_3H_6$ Ratio | 1.14 | 1.235 | 1.655 | 2.04 |

*Example 3*

A light petroleum cut of specific gravity $d_{15} = 0.671$ containing 223 p.p.m. of combined sulphur distilling over between 49° C. and 108° C. is processed under the same conditions as those described in the preceding example.

Such a cut is composed of 45.11% by weight of paraffinic hydrocarbons, 31.96% by weight of isoparaffinic hydrocarbons, 22.3% by weight of naphthenic hydrocarbons and 0.62% by weight of aromatic hydrocarbons.

The following results are achieved at average conversion temperatures varying between 740° C. and 822.5° C.

| Composition by Weight (kg./100 kg. of starting material) | Average Conversion Temperature (° C.) | | | | | |
|---|---|---|---|---|---|---|
| | 740 | 775 | 785.0 | 792.5 | 805 | 822.5 |
| $H_2$ | 0.6 | 0.8 | 1.0 | 1.1 | 1.6 | 2.2 |
| $CH_4$ | 9.0 | 11.1 | 14.8 | 16.4 | 20.4 | 23.5 |
| $C_2H_6$ | 3.3 | 3.4 | 3.5 | 4.2 | 3.6 | 3.5 |
| $C_2H_4$ | 16.2 | 19.8 | 24.4 | 26.9 | 29.8 | 31.9 |
| $C_3H_8$ | 0.1 | 0.1 | 0.2 | 0.2 | 0.2 | 0.2 |
| $C_3H_6$ | 14.5 | 15.0 | 14.2 | 14.3 | 9.0 | 6.5 |
| $C_4$ hydrocarbons | 12.2 | 11.4 | 9.4 | 8.0 | 6.2 | 5.0 |
| Condensable hydrocarbons | 39.2 | 33.6 | 26.6 | 20.9 | 20.1 | 15.6 |
| Carbon | 4.4 | 4.6 | 5.6 | 7.5 | 8.4 | 11.0 |
| $C_2H_4/C_3H_6$ ratio | 1.116 | 1.32 | 1.72 | 1.88 | 3.3 | 4.3 |

*Example 4*

The material processed under the conditions described in Example 2 is a light distillate from Kuwait with the following characteristics:

$d_{15}$: 0.668

Content of combined sulphur: 34 p.p.m.

Boiling point: 44° C. to 108° C.

Composition by volume:

|  | Percent |
|---|---|
| Paraffinic hydrocarbons | 52.23 |
| Isoparaffinic hydrocarbons | 24.57 |
| Naphthenic hydrocarbons | 19.40 |
| Aromatic hydrocarbons | 3.80 |

The following results have been achieved at average conversion temperatures ranging between 750° C. and 822.5° C.

| Composition by Weight (kg./100 kg. of starting material) | Average Conversion Temperature (°.C) | | | | |
|---|---|---|---|---|---|
| | 750 | 770 | 790 | 797.5 | 822.5 |
| $H_2$ | 0.90 | 1.30 | 1.60 | 2.10 | 2.84 |
| $CH_4$ | 9.70 | 13.00 | 15.80 | 18.30 | 21.05 |
| $C_2H_6$ | 3.60 | 4.30 | 4.20 | 4.20 | 4.42 |
| $C_2H_4$ | 18.70 | 23.80 | 27.20 | 30.00 | 32.00 |
| $C_3H_8$ | 0.10 | 0.20 | 0.20 | 0.20 | 0.24 |
| $C_3H_6$ | 16.60 | 18.10 | 16.90 | 14.00 | 9.62 |
| $C_4$ hydrocarbons | 11.40 | 7.40 | 5.20 | 3.90 | 2.98 |
| Condensable hydrocarbons | 32.40 | 25.00 | 21.00 | 18.00 | 17.00 |
| Carbon | 6 | 6 | 7 | 8.2 | 9 |
| $C_2H_4/C_2H_6$ ratio | 1.25 | 1.315 | 1.61 | 2.14 | 3.33 |

Example 5

A light distillate from the province of Hassi R'Mel, with a specific gravity $d_{15}=0.714$ containing 13 p.p.m. of combined sulphur having a distillation curve of between 32° C. and 108° C., is used as starting material.

The results achieved under the same operating conditions as described in Example 2 are shown in the following table:

| Composition by Weight (kg./100 kg. of starting material) | Average Conversion Temperature (° C.) | | | | | |
|---|---|---|---|---|---|---|
| | 772.5 | 775 | 780 | 785 | 802.5 | 827.5 |
| $H_2$ | 0.95 | 1.01 | 1.27 | 1.2 | 1.45 | 1.71 |
| $CH_4$ | 10.84 | 12.15 | 13.68 | 14.33 | 16.87 | 18.65 |
| $C_2H_6$ | 2.43 | 3.27 | 3.59 | 3.70 | 3.34 | 3.08 |
| $C_2H_4$ | 22.01 | 23.00 | 26.20 | 27.03 | 29.52 | 31.00 |
| $C_3H_8$ | 0.77 | 1.08 | 0.56 | 0.51 | 0.36 | 0.31 |
| $C_3H_6$ | 11.36 | 11.80 | 10.97 | 11.98 | 9.81 | 8.01 |
| $C_4$ hydrocarbons | 9.82 | 9.68 | 8.58 | 7.72 | 6.05 | 5.02 |
| Condensable hydrocarbons | 36.05 | 34.92 | 29.60 | 25.75 | 20.35 | 16.38 |
| Carbon | 2.77 | 3.09 | 5.55 | 8.37 | 12.25 | 15.82 |
| $C_2H_4/C_3H_6$ ratio | 1.94 | 1.95 | 2.39 | 2.26 | 3.0 | 3.88 |

Example 6

Referring to above Examples 2 to 5, it is ascertained that by operating at temperatures of about 750° C., about 300 to 400 kg. of condensable products containing only 35 to 40% of aromatic hydrocarbons per ton of converted distillate are obtained.

Such uneasily vaporizable by-products are processed according to the process of the invention, in a second cracking step identical with the former but carried out at elevated temperature. An additional amount of gas richer in propylene with a low content of condensable products is then obtained. The latter contain about 98% of aromatic hydrocarbons.

According to Example 4, by subjecting the condensable products btained at 750° C. from Kuwait's light distillate to a further processing identical with the preceding one at a temperature of about 810° C., there are obtained from 324 kg. of starting material:

|  | Kg. |
|---|---|
| $H_2$ | 7.9 |
| $CH_4$ | 44.5 |
| $C_2H_6$ | 10.2 |
| $C_2H_4$ | 60.0 |
| $C_3H_6$ | 30.0 |
| $C_3H_8$ | 1.7 | and 128.7 kg. of condensable products containing 98% of aromatic hydrocarbons.

By adding these reaction products to the previously manufactured gaseous mixture, it is possible to obtain from 1,000 kg. of Kuwait's light distillate processed in two successive cracking steps at 750° C. and 810° C., in the presence of a total amount of steam of 1,425 kg., a final product of the following composition by weight:

|  | Kg. |
|---|---|
| $H_2$ | 169.0 |
| $CH_4$ | 141.5 |
| $C_2H_6$ | 46.2 |
| $C_2H_4$ | 247.0 |
| $C_3H_6$ | 196.0 |
| $C_3H_8$ | 2.7 |
| $C_4$ hydrocarbons | 130.5 |
| Condensate containing 98% of aromatic hydrocarbons | 128.7 |

$$\frac{C_2H_4}{C_3H_6}=1.26$$

Carbon 80.5 kg.

What is claimed is:

1. In the manufacture of ethylene- and propylene-rich gases in a ratio of ethylene to propylene of about 1 to 5, with condensable side reaction products comprising 98% aromatic hydrocarbons, comprising the steps of cracking hydrocarbons of higher molecular weight at 700°–900° C. by a cyclic process in the presence of steam in the absence of oxygen, the steam to hydrocarbon ratio lying between 0.5–1.5, the improvements which comprise passing the hydrocarbon-steam mixture through a contact zone containing a fixed mass of refractory material having a height to diameter ratio of between 0.5–1.2, said refractory material comprising particles having an average diameter of 10–20 mm.

2. A process in accordance with claim 1 wherein the height to diameter ratio of the contact mass is between 0.7–0.9.

3. A process in accordance with claim 1 wherein the refractory material is selected from the group consisting of silicates, aluminates, silicaluminates and oxides of metals of the second and third groups of the Periodic Table.

4. A process in accordance with claim 1 wherein the higher the temperature used in the range of 700° C.–900° C., the higher the ethylene to propylene ratio by weight obtained.

5. A process for the manufacture of ethylene- and propylene-rich gases from hydrocarbons of higher molecular weight by a cyclic process in the presence of steam in accordance with claim 1 comprising passing said hydrocarbon-steam mixture through said contact mass of grains of refractory material having said height to diameter ratio of between 0.5–1.2, with said steam to hydrocarbon ratio by weight of 0.5–1.5 at said average reaction temperature of 700° C.–900° C. and then subjecting the condensable reaction products of this first reaction step to a further processing step identical to the first reaction step but at a higher temperature within said temperature range.

References Cited

UNITED STATES PATENTS

| 2,174,196 | 9/1939 | Rogers | 260—683 |
| 3,019,272 | 1/1962 | Steinhofer et al. | 260—683 |
| 3,221,076 | 11/1965 | Frey et al. | 260—683 |

FOREIGN PATENTS

| 832,521 | 4/1960 | Great Britain. |

DELBERT E. GANTZ, *Primary Examiner.*

C. E. SPRESSER, *Assistant Examiner.*